US012615357B2

(12) United States Patent
Lim

(10) Patent No.: US 12,615,357 B2
(45) Date of Patent: Apr. 28, 2026

(54) IMMERSIVE DISPLAY CONTROLLER INTERFACE

(71) Applicant: Samsung Electronics Co., Ltd., Suwon-si (KR)

(72) Inventor: Youngkwon Lim, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 330 days.

(21) Appl. No.: 18/347,501

(22) Filed: Jul. 5, 2023

(65) Prior Publication Data

US 2024/0022700 A1     Jan. 18, 2024

Related U.S. Application Data

(60) Provisional application No. 63/388,477, filed on Jul. 12, 2022.

(51) Int. Cl.
| | |
|---|---|
| *H04N 13/282* | (2018.01) |
| *H04N 13/111* | (2018.01) |
| *H04N 13/194* | (2018.01) |

(52) U.S. Cl.
CPC ......... *H04N 13/282* (2018.05); *H04N 13/111* (2018.05); *H04N 13/194* (2018.05)

(58) Field of Classification Search
CPC ... H04N 13/282; H04N 13/194; H04N 13/111
See application file for complete search history.

(56) References Cited

U.S. PATENT DOCUMENTS

| | | | |
|---|---|---|---|
| 2011/0032999 A1* | 2/2011 | Chen .................. | H04N 21/2365 375/E7.021 |
| 2013/0050187 A1* | 2/2013 | Korcsok ................ | G06T 7/593 345/419 |
| 2016/0182881 A1* | 6/2016 | Thiebaud ............. | H04N 13/351 348/43 |
| 2023/0128826 A1* | 4/2023 | Abhishek ............... | G06T 17/00 348/48 |
| 2024/0080501 A1* | 3/2024 | Brandt ................. | H04N 13/172 |

OTHER PUBLICATIONS

"Text of WD1 for MPEG-I Part 28," International Organization for Standardization Organisation Internationale de Normalisation, ISO/ IEC JTC 1/SC 29/WG 7, Apr. 2022, France, 38 pages.

* cited by examiner

*Primary Examiner* — Mohamed A. Wasel

(57) ABSTRACT

An apparatus includes a communication interface and a processor operably coupled to the communication interface. The communication interface is configured to communicate with a display controller. The processor is configured to receive, via the communication interface, display characteristics of the display controller including a number of views that the display controller is capable of rendering. The processor is also configured to determine an amount of views to generate based on the number of views that the display controller is capable of rendering. The processor is further configured to transmit, via the communication interface, the determined amount of views to be generated to the display controller. In addition, the processor is configured to generate views according to the determined amount of views.

20 Claims, 5 Drawing Sheets

500

START

502

RECEIVE DISPLAY CHARACTERISTICS
OF A DISPLAY CONTROLLER

504

DETERMINE AN AMOUNT OF VIEWS TO GENERATE

506

TRANSMIT THE DETERMINED AMOUNT
OF VIEWS TO THE DISPLAY CONTROLLER

508

GENERATE VIEWS

END

IMMERSIVE DISPLAY CONTROLLER INTERFACE

CROSS-REFERENCE TO RELATED APPLICATION AND PRIORITY CLAIM

This application claims priority under 35 U.S.C. § 119(e) to U.S. Provisional Patent Application No. 63/388,477 filed on Jul. 12, 2022, which is hereby incorporated by reference in its entirety.

TECHNICAL FIELD

This disclosure relates generally to media devices and processes. More specifically, this disclosure relates to an immersive display controller interface.

BACKGROUND

Architectures and capabilities of the immersive displays largely vary. The rendering engine must provide contents according to the type of the displays, but the current architecture for an interface between a game engine client and a display controller does not provide a sufficient communication to exchange appropriate information.

SUMMARY

This disclosure provides an immersive display controller interface.

In a first embodiment, an apparatus includes a communication interface and a processor operably coupled to the communication interface. The communication interface is configured to communicate with a display controller. The processor is configured to receive, via the communication interface, display characteristics of the display controller including a number of views that the display controller is capable of rendering. The processor is also configured to determine an amount of views to generate based on the number of views that the display controller is capable of rendering. The processor is further configured to transmit, via the communication interface, the determined amount of views to be generated to the display controller. In addition, the processor is configured to generate views according to the determined amount of views.

In a second embodiment, a method includes receiving, via a communication interface, display characteristics of a display controller including a number of views that the display controller is capable of rendering. The method also includes determining an amount of views to generate based on the number of views that the display controller is capable of rendering. The method further includes transmitting, via the communication interface, the determined amount of views to be generated to the display controller. In addition, the method includes generating views according to the determined amount of views.

In a third embodiment, a non-transitory machine readable medium stores instructions that when executed cause a processor to receive, via a communication interface, display characteristics of a display controller including a number of views that the display controller is capable of rendering. The instructions that when executed also cause the processor to determine an amount of views to generate based on the number of views that the display controller is capable of rendering. The instructions that when executed further cause the processor to transmit, via the communication interface, the determined amount of views to be generated to the display controller. In addition, the instructions that when executed cause the processor to generate views according to the determined amount of views.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 5, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

A number of views that immersive displays can render varies. Some immersive displays also can interpolate views as needed. In certain cases, immersive displays can interactively render views according to a user viewpoint. Such information needs to be communicated to the game engine for rendering the appropriate content.

For architectures in which client devices are heterogeneous and game engines are employed as media ingest portals for heterogeneous client systems, the complexity to render the media according to the capabilities of the client device and to the requirements of the application can vary widely. In such an architecture, the network system may assume some of the tasks of rendering the media on behalf of the client. Accordingly, for such network systems, a means of measuring the complexity to render each media asset becomes essential.

Figure 1:
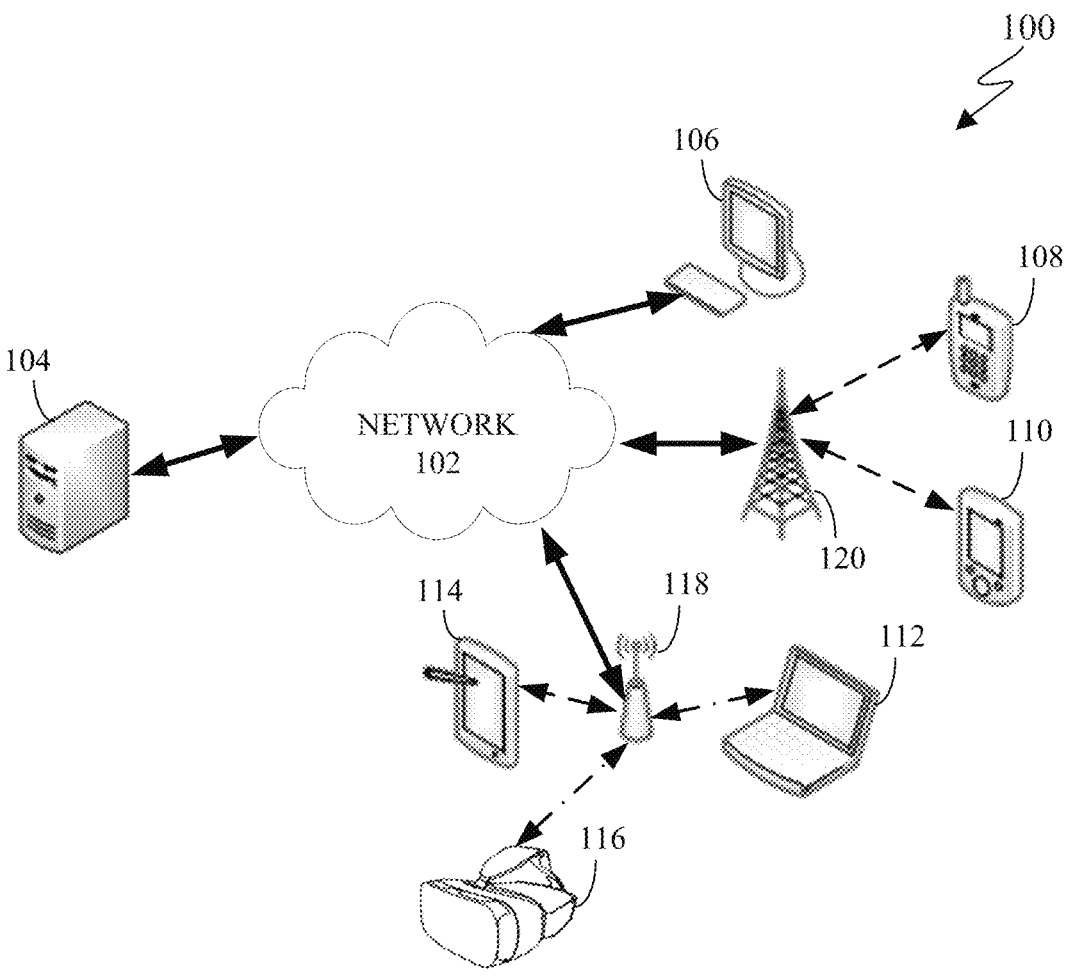
FIG. 1 illustrates an example communication system in accordance with an embodiment of this disclosure.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

As shown in FIG. 1, the communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a TV, an interactive display, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud or mesh, to one or more display devices, such as a client device 106-116. In certain embodiments, each server 104 can include an immersive display controller interface in order to transmit or receive information related to an amount of views that a display controller can render and interpolate and also a position of a user in relation a display.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display 360° scenes including one or more dynamic or static 3D point clouds. In certain embodiments, any of the client devices 106-116 can include an encoder, decoder, or both. For example, the mobile device 108 can record a 3D volumetric video and then encode the video enabling the video to be transmitted to one of the client devices 106-116. In another example, the laptop computer 112 can be used to generate a 3D point cloud or mesh, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeBs (eNBs). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud or mesh, generate a bitstream that represents the point cloud or mesh, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud or mesh, compress a 3D point cloud or mesh, transmit a 3D point cloud or mesh, receive a 3D point cloud or mesh, decode a 3D point cloud or mesh, render a 3D point cloud or mesh, or a combination thereof. For example, the server 104 can then compress 3D point cloud or mesh to generate a bitstream and then transmit the bitstream to one or more of the client devices 106-116. For another example, one of the client devices 106-116 can compress a 3D point cloud or mesh to generate a bitstream and then transmit the bitstream to another one of the client devices 106-116 or to the server 104. In certain embodiments, the client devices 106-116 implement an immersive display controller interface in order to transmit or receive information related to an amount of views that a display controller can render and interpolate and also a position of a user in relation a display.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
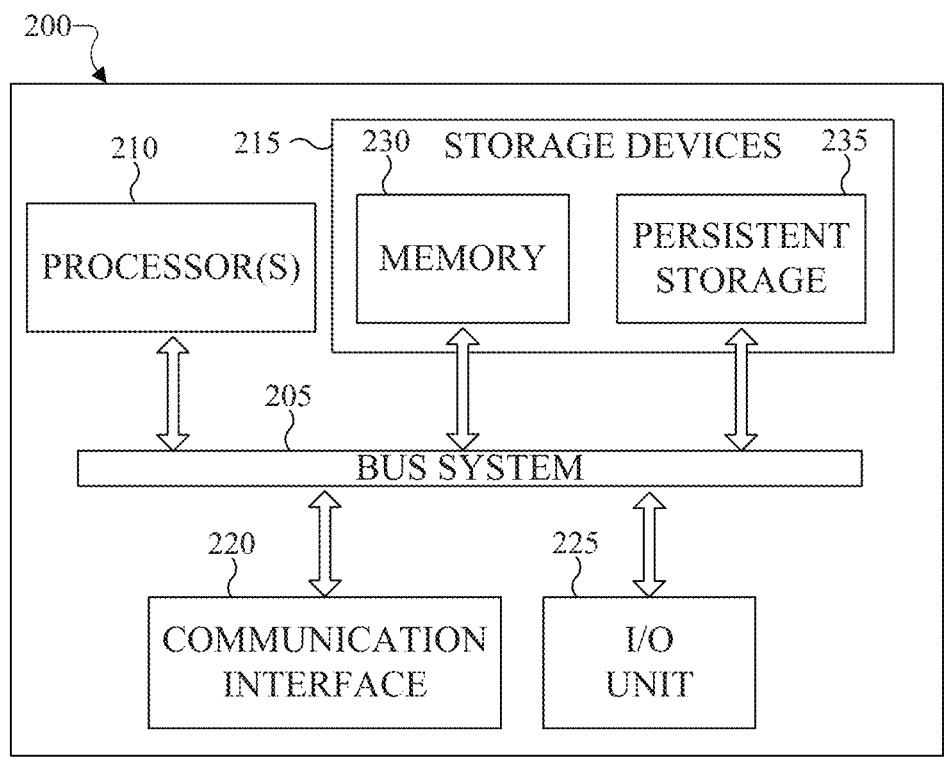
FIGS. 2 and 3 illustrate example electronic devices in accordance with an embodiment of this disclosure.
Figure 3:
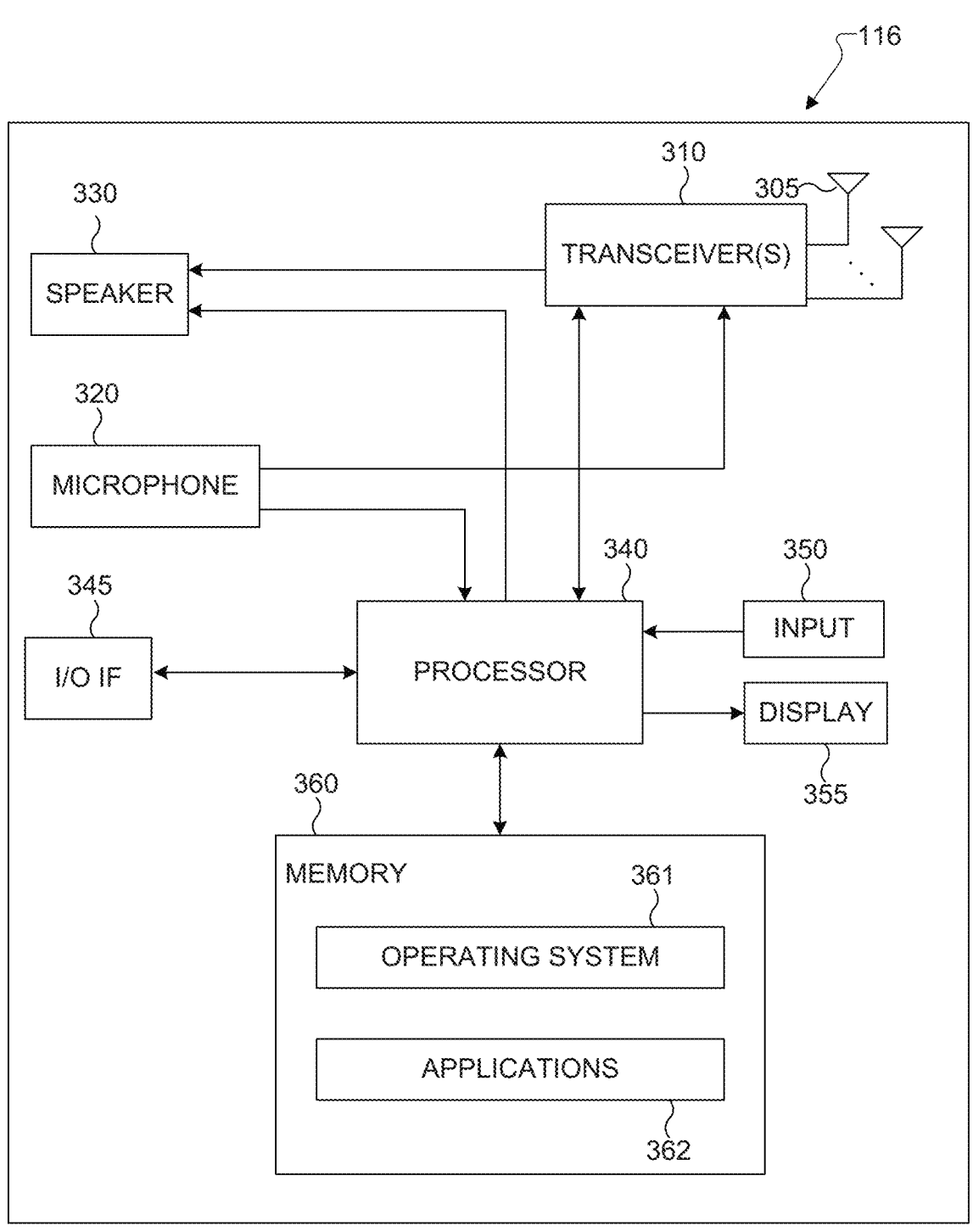

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

As shown in FIG. 2, the server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

In certain embodiments, the processor 210 can encode a 3D point cloud or mesh stored within the storage devices 215. In certain embodiments, encoding a 3D point cloud also decodes the 3D point cloud or mesh to ensure that when the point cloud or mesh is reconstructed, the reconstructed 3D point cloud or mesh matches the 3D point cloud or mesh prior to the encoding. In certain embodiments, the processor 210 can be communicatively coupled to an immersive display controller interface.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection. The I/O unit 225 can include an immersive display controller interface in order to transmit or receive information related to an amount of views that a display controller can render and interpolate and also a position of a user in relation a display.

Note that while FIG. 2 is described as representing the server 104 of FIG. 1, the same or similar structure could be used in one or more of the various client devices 106-116. For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver, transmit (TX) processing circuitry, a microphone 320, and receive (RX) processing circuitry 325. The RF transceiver can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver receives from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry receives analog or digital voice data from the microphone 320 or other outgoing baseband data from the processor 340. The outgoing baseband data can include web data, e-mail, or interactive video game data. The TX processing circuitry encodes, multiplexes, and/or digitizes the outgoing baseband data to generate a processed baseband or intermediate frequency signal. The RF transceiver receives the outgoing processed baseband or intermediate frequency signal from the TX processing circuitry and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example, applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content. In certain embodiments, the processor 340 can be communicatively coupled to an immersive display controller interface in order to transmit or receive information related to an amount of views that a display controller can render and interpolate and also a position of a user in relation a display.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud or mesh.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, meshes, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a virtual object or capture (or record) content through a camera. The electronic device 300 can encode the media content to generate a bitstream, such that the bitstream can be transmitted directly to another electronic device or indirectly such as through the network 102 of FIG. 1. The electronic device 300 can receive a bitstream directly from another electronic device or indirectly such as through the network 102 of FIG. 1.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server.

Figure 4:
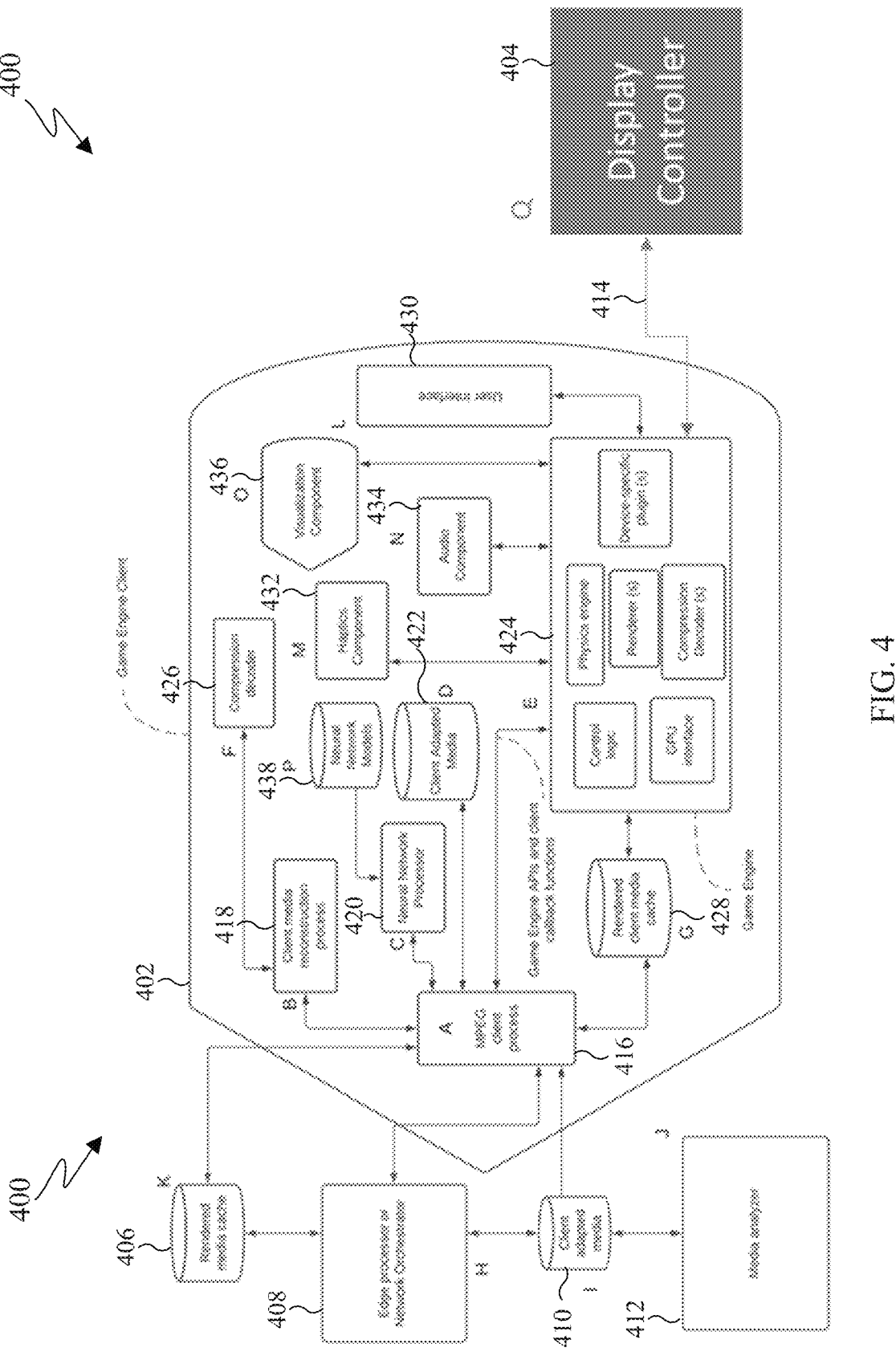
FIG. 4 illustrates a block diagram of an example environment-architecture in accordance with an embodiment of this disclosure.

FIG. 4 illustrates a block diagram of an example environment-architecture 400 for a game engine client 402 in accordance with an embodiment of this disclosure. The embodiment of the environment-architecture 400 illustrated in FIG. 4 is for illustration only. The environment-architecture 400 can include one or more of game engine clients 402, display controllers 404, rendered media cache 406, edge processor or network orchestrator 408, client adapted media 410, and media analyzer 412. The game engine client 402 can be represented by the server 200 shown in FIG. 2 or the electronic device 300 shown in FIG. 3. FIG. 4 does not limit the scope of this disclosure to any particular implementation of an environment-architecture.

As shown in FIG. 4, a display controller 404 can be communicatively connected to the game engine client 402 through an immersive display controller interface 414. The display controller 404 can connect the game engine client 402 to an immersive display. The display controller 404 can exchange information for rendering of contents with the game engine client 402 according to the immersive display characteristics and capabilities.

The game engine client 402 can include a MPEG client processor 416, a client media reconstruction processor 418, a neural network processor 420, a client adapted media storage 422, a game engine 424, a compression decoder 426, a rendered client media cache 428, a user interface 430, a haptics component 432, an audio component 434, a visualization component 436, and a neural network model 438. The MPEG client processor 416, the client media reconstruction processor 418, the neural network processor 420, the game engine 424, and the compression decoder 426 can be implemented using one or more processors 210 and one or more processors 340. The client adapted media storage 422, the rendered client media cache 428, and the neural network model 438 can be implemented on one or more storage devices 215 and one or more memory 360. The user interface 430, a haptics component 432, an audio component 434, and a visualization component 436 can be represented by the I/O unit 225 and the I/O interface 345.

The MPEG client processor 416 can control or initiate the client media reconstruction processor 418 to reconstruct compressed media. The MPEG client processor 416 can control or initiate the neural network processor 420 to apply a neural network process to the media. The MPEG client processor 416 can control or initiate the client adapted media storage 422 to store client-adapted media in a local cache. The MPEG client processor 416 can control the game engine 424 to launch game engine processing of a scene-based media presentation. The MPEG client processor 416 can configure the rendered client media cache 428 to receive rendered-media associated with a particular asset. The MPEG client processor 416 can access information from the rendered client media cache 428 associated with a particular asset. The MPEG client processor 416 can initiate a process to access a presentation through the edge processor or network orchestrator 408. The MPEG client processor 416 can access information associated with client-adapted media through the client adapted media 410. The MPEG client processor 416 can access information associated with a pre-rendered asset through the rendered media cache 406.

The client media reconstruction processor 418 can provide information about available compression decoders 426 and other resources available for decompressing and or reconstructing assets to the MPEG client processor 416. The client media reconstruction processor 418 can also provide information about assets that have been reconstructed to the MPEG client processor 416. The client media reconstruction processor 418 can initiate a reconstruction or decompression process for a particular asset by the compression decoder 426.

The neural network processor 420 can provide information about neural network processes and models that are available to the client to the MPEG client processor 416. The neural network processor 420 can also provide information about assets to which neural network processes or models have been applied to the MPEG client processor 416.

The client adapted media storage 422 can provide information about assets that are available to the client to the MPEG client processor 416.

The game engine 424 can respond to a request from the MPEG client processor 416. The game engine 424 can issue a call back request pertaining to particular scenes and or assets for a particular scene to the MPEG client processor 416. The game engine 424 can report on status and or interruptions related to the processing of a particular scene or presentation to the MPEG client processor 416. The game engine 424 can access information about an asset that is stored in the rendered client media cache 428. The game engine 424 can request inputs from the user interface 430, haptics component 432, audio component 434, and the visualization component 436.

The compression decoder 426 can provide decompressed media to the client media reconstruction processor 418.

The rendered client media cache 428 can provide information pertaining to rendered media to the MPEG client processor 416. The rendered media cache can provide information pertaining to rendered media to the game engine 424.

The edge processor or network orchestrator 408 can respond to a request from the game engine client 402 for access to presentation manifests or access to pre-rendered media suitable for the game engine client 402. The edge processor or network orchestrator 408 can update the client-adapted media 410. The edge processor or network orchestrator 408 can process updates for the rendered media cache 406.

The client adapted media 410 can provide media and media information to the edge processor or network orchestrator 408. The client adapted media 410 can provide media and media information to the media analyzer 412. The media analyzer 412 can update media-information in the client adapted media 410.

The rendered media cache 406 can provide media and media information to the edge processor or network orchestrator 408. The rendered media cache 406 can provide media and media information to the MPEG client processor 416.

The user interface 430 can provide user updates to the game engine 424. The haptics component 432 can provide rendered haptics information and feedback to the game engine 424. The audio component 434 can provide rendered audio information and feedback to the game engine 424. The visualization component 436 can provide rendered visual information and feedback to the game engine 424. The neural network model 438 can provide neural network model information to the neural network processor 420.

The display controller 404 can exchange capabilities and characteristics of an immersive display with the game engine 424. The information exchanged may include the number of views the display can render with angular distance of each view and the number of views the display can interpolate and capability of detecting user's viewpoint for interactive and adaptive rendering and display.

The game engine 424 can exchange capabilities and characteristics of the immersive display with the display controller 404. The information exchange may include the number of views the game engine 424 will generate and the capability of interactive rendering according to the user's viewpoint detected by the immersive display.

Although FIG. 4 illustrates an example environment-architecture 400 for a game engine client 402, various changes may be made to FIG. 4. For example, the number and placement of various components of the environment-architecture 400 can vary as needed or desired. In addition, the environment-architecture 400 may be used in any other suitable media process and is not limited to the specific processes described above.

Figure 5:
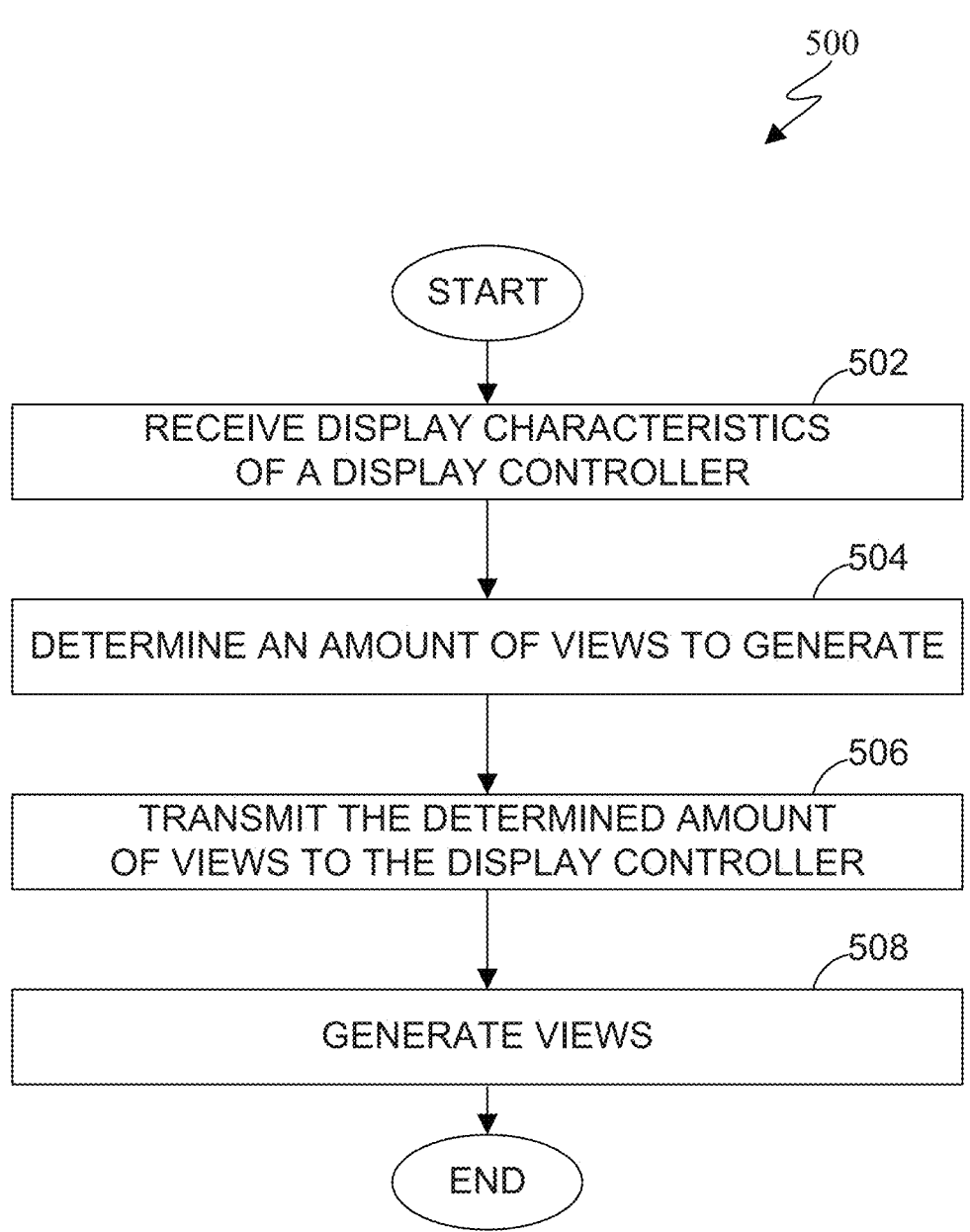
FIG. 5 illustrates an example method for an immersive display controller interface according to this disclosure.

FIG. 5 illustrates an example method 500 for an immersive display controller interface according to this disclosure. For ease of explanation, the method 500 of FIG. 5 is described as being performed by the game engine client 402 using the immersive display controller interface 414 of FIG. 4. However, the method 500 may be used with any other suitable system and any other suitable game engine client.

As shown in FIG. 5, the game engine client 402 can receive display characteristics of the display controller at step 502. The display characteristics can include a number of views that the display controller is capable of rendering, angular distances for each of the views that the display controller is capable of rendering, a number of views that the display controller is capable of interpolating, a capability of the display controller to detect a user viewpoint for interactive and adaptive rendering and displaying, and a viewing angle for the viewpoint of the user in relation to the immersive display.

The game engine client 402 can determine an amount of views to generate based on the received display characteristics at step 504. The amount of views can be determined based on a combination of the number of views that the display controller is capable of rendering and the number of views that the display controller is capable of interpolating. The amount of views to generate can be determined as equal to a difference in the number of views that the display controller is capable of rendering and the number of views that the display controller is capable of interpolating.

The display controller 404 can send information about a number of renderable views and a number of interpolated views that the display can process. The game engine client 402 can receive the information and determine an amount of views to generate by the game engine client 402.

When the number of renderable views is smaller than a maximum amount of generatable views, then the amount of views generated by the game engine client 402 is equal to the number of renderable views by the display controller

404. When the number of renderable views is greater than a maximum amount of generatable views, then the game engine client 402 transmits the maximum amount of generatable views and the display controller 404 can interpolate views up to the amount of interpolated views that the display can process.

The game engine client 402 can transmit the determined amount of views to be generated to the display controller at step 506. The immersive display controller 404 can use the information on the amount of views that the game engine client is going to generate in order to interpolate views for the immersive display.

The game engine client 402 can generate views according to the determined amount of views at step 508. The game engine client 402 can generate the views and transmit the views to the display controller 404.

Although FIG. 5 illustrates one example of a method 500 for an immersive display controller interface, various changes may be made to FIG. 5. For example, while shown as a series of steps, various steps in FIG. 5 may overlap, occur in parallel, or occur any number of times.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. An apparatus comprising:
    a communication interface configured to communicate with a display controller; and
    a processor operably coupled to the communication interface and configured to:
        receive, via the communication interface, display characteristics of the display controller including a number of views that the display controller is capable of rendering and a number of views that the display controller is capable of interpolating;
        determine a quantity of views to generate based on both the number of views that the display controller is capable of rendering and the number of views that the display controller is capable of interpolating;
        transmit, via the communication interface, the determined quantity of views to be generated to the display controller; and
        generate views according to the determined quantity of views.

2. The apparatus of claim 1, wherein the received display characteristics further includes angular distances for each of the views that the display controller is capable of rendering.

3. The apparatus of claim 1, wherein, to generate the views according to the determined quantity of views, the processor is configured to interpolate views for display based on the determined quantity of views to be generated.

4. The apparatus of claim 3, wherein, to determine the quantity of views to generate based on the received display characteristics, the processor is configured to determine the quantity of views to generate based on a combination of the number of views that the display controller is capable of rendering and the number of views that the display controller is capable of interpolating.

5. The apparatus of claim 3, wherein, to determine the quantity of views to generate based on the received display characteristics, the processor is configured to:

determine the quantity of views to generate equal to a difference in the number of views that the display controller is capable of rendering and the number of views that the display controller is capable of interpolating.

6. The apparatus of claim 1, wherein the received display characteristics further includes a capability of the display controller to detect a user viewpoint for interactive and adaptive rendering and displaying.

7. The apparatus of claim 6, wherein, to determine the quantity of views to generate, the processor is further configured to:

receive the user viewpoint in relation to a display of the display controller; and determine the quantity of views to generate based on the user viewpoint.

8. A method comprising:

receiving, via a communication interface, display characteristics of a display controller including a number of views that the display controller is capable of rendering and a number of views that the display controller is capable of interpolating;

determining a quantity of views to generate based on both the number of views that the display controller is capable of rendering and the number of views that the display controller is capable of interpolating;

transmitting, via the communication interface, the determined quantity of views to be generated to the display controller; and generating views according to the determined quantity of views.

9. The method of claim 8, wherein the received display characteristics further includes angular distances for each of the views that the display controller is capable of rendering.

10. The method of claim 8, wherein generating the views according to the determined quantity of views includes interpolating views for display based on the determined quantity of views to be generated.

11. The method of claim 10, wherein determining the quantity of views to generate based on the received display characteristics comprises:

determining the quantity of views to generate based on a combination of the number of views that the display controller is capable of rendering and the number of views that the display controller is capable of interpolating.

12. The method of claim 10, wherein determining the quantity of views to generate based on the received display characteristics comprises determining the quantity of views to generate equal to a difference in the number of views that the display controller is capable of rendering and the number of views that the display controller is capable of interpolating.

13. The method of claim 8, wherein the received display characteristics further includes a capability of the display controller to detect a user viewpoint for interactive and adaptive rendering and displaying.

14. The method of claim 13, wherein determining the quantity of views to generate comprises:

receiving the user viewpoint in relation to a display of the display controller; and determining the quantity of views to generate based on the user viewpoint.

15. A non-transitory computer readable medium containing instructions that when executed cause a processor to:

receive, via a communication interface, display characteristics of a display controller including a number of views that the display controller is capable of rendering and a number of views that the display controller is capable of interpolating;

determine a quantity of views to generate based on the number of views that the display controller is capable of rendering and the number of views that the display controller is capable of interpolating;

transmit, via the communication interface, the determined quantity of views to be generated to the display controller; and generate views according to the determined quantity of views.

16. The non-transitory computer readable medium of claim 15, wherein the received display characteristics further includes angular distances for each of the views that the display controller is capable of rendering.

17. The non-transitory computer readable medium of claim 15, wherein the instructions that when executed cause the processor to generate the views according to the determined quantity of views comprise instructions that when executed cause the processor to interpolate views for display based on the determined quantity of views to be generated.

18. The non-transitory computer readable medium of claim 17, wherein the instructions that when executed cause the processor to determine the quantity of views to generate based on the received display characteristics comprise instructions that when executed cause the processor to:

determine the quantity of views to generate based on a combination of the number of views that the display controller is capable of rendering and the number of views that the display controller is capable of interpolating.

19. The non-transitory computer readable medium of claim 17, wherein the instructions that when executed cause the processor to determine the quantity of views to generate based on the received display characteristics comprise instructions that when executed cause the processor to:

determine the quantity of views to generate equal to a difference in the number of views that the display controller is capable of rendering and the number of views that the display controller is capable of interpolating.

20. The non-transitory computer readable medium of claim 15, wherein:

the received display characteristics further includes a capability of the display controller to detect a user viewpoint for interactive and adaptive rendering and displaying and the instructions that when executed cause the processor to, to determine the quantity of views to generate comprise instructions that when executed cause the processor to:

receive the user viewpoint in relation to a display of the display controller; and determine the quantity of views to generate based on the user viewpoint.

* * * * *